United States Patent [19]

Esaki et al.

[11] 3,746,879

[45] July 17, 1973

[54] SUPERLATTICE HARMONIC GENERATOR & MIXER FOR ELECTROMAGNETIC WAVES

[75] Inventors: Leo Esaki, Chappaqua; Raphael Tsu, Yorktown Heights, both of N.Y.

[73] Assignee: International Business Machines Corporation, Armonk, N.Y.

[22] Filed: May 25, 1972

[21] Appl. No.: 257,044

[52] U.S. Cl. .............. 307/88.3, 321/69 R, 250/199, 350/160 R, 350/162 R

[51] Int. Cl. .......................... G02f 1/28, H02m 5/06

[58] Field of Search .................... 250/199; 307/88.3; 321/69; 350/160

*Primary Examiner*—Roy Lake
*Assistant Examiner*—Darwin R. Hostetter
*Attorney*—Thomas J. Kilgannon et al.

[57] ABSTRACT

The disclosure relates to a device for generating electromagnetic waves which have wavelengths different from an input wavelength to the device. The device consists of man-made superlattice structure fabricated by epitaxial deposition techniques to which at least one electromagnetic wave is applied. The input wave has an electric field component parallel to the longitudinal axis of the superlattice structure. Because of the special characteristic of the superlattice structure, it is possible to obtain as outputs all the odd harmonics of the input wavelength. By applying an electric field parallel to the longitudinal axis of the superlattice, it is possible to obtain both odd and even harmonics of the input wavelength. By switching the electric field, a gating action is obtained. To select the desired harmonic, appropriate filters are used. Mixing as well as harmonic generation is possible with the arrangements disclosed by applying a plurality of input wavelengths which by multiple photon processes produce outputs having relatively long wavelengths compared to the input wavelength. The mixed outputs in both the presence and absence of an applied electric field are obtainable by filtering. Thus, inputs in the visible range may be mixed to provide outputs in the far infrared region which are not easily obtainable using prior art arrangements.

18 Claims, 4 Drawing Figures

Patented July 17, 1973 3,746,879

2 Sheets-Sheet 1

SUPERLATTICE HARMONIC GENERATOR & MIXER FOR ELECTROMAGNETIC WAVES

BACKGROUND OF THE INVENTION

1. Field of the Invention

This invention relates to artificially produced superlattice devices and, more particularly relates to the operation of such devices as harmonic generators and mixers when combined with at least a single electromagnetic wave source or a plurality of such sources, respectively, and a switchable electric field which is applied parallel to the longitudinal axis of the superlattice structure. More specifically in one embodiment, a single input wavelength applied to the superlattice such that at least a component of the electric field thereof is parallel to the longitudinal axis of the superlattice and in the absence of an applied electrostatic field, provides all the odd harmonics of the input wavelength. By appropriately filtering, a desired harmonic may be selected. By applying the electrostatic field, both odd and even harmonics of the input wavelength are provided, and if, for example, it is desired to obtain the second harmonic, an appropriate filter may be utilized at the output. In another embodiment, the electric field of an input electromagnetic wave is constrained in a waveguide mode such that the electric field thereof is oriented in a direction parallel to the longitudinal axis of the superlattice by introducing the input electromagnetic wave into the superlattice via a grating. The wave interacts with the superlattice to provide, via an output grating and an appropriate filter, the desired odd or even harmonic. In still other embodiments, mixed outputs having relatively long wavelengths may be obtained by applying a plurality of input wavelengths by well-known optical means to the superlattice. Under such circumstances, the sum and difference of the odd and even harmonics in the absence and in the presence of an electrostatic field, respectively, are obtained using the appropriate filters. In this manner, wavelengths in the infrared and far infrared regions, for example, are obtainable using wavelengths in the visible region.

2. Description of the Prior Art

Pertinent prior art in terms of the basic theoretical considerations involved in the present invention is found in the book by Brillion entitled "Wave Propagation in Periodic Structures," published by McGraw-Hill Book Co., Inc., 1953. From an application standpoint, U. S. Pat. No. 2,975,377 issued on Mar. 14, 1961 to P. J. Price and J. W. Horton, is pertinent in the teaching relative to a device with bulk negative resistance produced by interaction of carriers with a periodic potential associated with the crystalline lattice itself. Other art which is principally of interest in that it deals with bulk negative resistance, though produced by different phenomena, is as follows:

a. U.S. Pat. No. 3,365,583 issued on Jan. 23, 1968, to J. B. Gunn;
b. U.S. Pat. No. 3,458,832 issued on Aug. 29, 1969, to J. C. McGroddy and M. I. Nathan;
c. An article by Riddley and Pratt entitled "A Bulk Differential Negative Resistance Due to Electron Tunneling Through an Impurity Potential Barrier," which appeared in Physics Letters, Vol. 4, 1963, pages 300–302; and
d. British Pat. No. 849,476 to J. B. Gunn, published on Sept. 28, 1960.

The following patents and articles relate directly to the fabrication of superlattice structure or discuss prior art mixing and harmonic generation techniques:

a. U.S. Pat. No. 3,626,257 issued on Dec. 7, 1971 to L. Esaki, R. Ludeke and R. Tsu entitled "Semiconductor Device With Superlattice Region."

This patent relates to the structure and method of fabrication of an artificial superlattice which exhibits a periodic potential different from that of a uniform crystal lattice with which carriers in the material interact to produce desired nonlinear characteristics. The superlattice includes what may be termed a one-dimensional spatial variation in the band edge energy. The superlattice structure is achieved by forming a plurality of successive layers of semiconductor material with differnet energy-band characteristics. A first and alternate layers exhibit a different band edge energy from second and alternate layers of semiconductor material. This is accomplished either by alloying or doping and results in a one-dimensional periodic spatial variation in the band edge energy. A sufficient number of spatial periods are provided to obtain the necessary interaction for the desired nonlinear characteristics. The period of the spatial variation is, however, sufficiently large that there is formed by this superlattice, in wave vector space ($k$), a number of mini-zones which are much smaller than the Brillion zones associated with the crystal lattice itself. The one-dimensional superlattice normally has a period of 50–500A. obtained by a periodic variation of alloy composition, using compound semiconductors such as $GaAs_{1-x}P_x$, $Ga_{1-x}Al_xA_s$, $Cd_{1-x}Hg_xTe$, etc. If the periodicity is nearly perfect and the mean-free path of an electron is considerably longer than the period, such a giant man-made period in configuration space will give rise to a series of mini-zones in momentum space.

b. An article entitled "Optical Non-Linearities Due to Mobile Carriers in Semiconductors," by C. K. N. Patel, R. E. Slusher and P. A. Fleury, Physical Review Letters, Vol. 17, No. 19, pages 1011–1014, 1966 discusses the observation of optical non-linearities arising from conduction electrons in semi-conductors, such as indium antiminide.
c. An article entitled "Theory of Optical Mixing by Mobile Carriers in Semiconductors" by P. A. Wolfe and G. A. Pitson, Physical Review Letters, Vol. 17, No. 19, pages 1015–1017, 1966 proposes that the observed non-linearity in (b) above is due to nonparabolicity of the conduction band.
d. An article entitled "Non-linear Optical Susceptabilities in Group IV and III-V Semiconductors," by S. S. Jha and N. Bloembergen, Physical Review, Vol. 171, No. 3, page 891 (1968), enlarges on the contribution of the article of (b) above.
e. An article entitled "Non-linear Optical Properties of Periodical Laminar Structures," by N. Bloembergen and A. J. Sievers, J. A. P., Letters 17, 483 (1970), discusses a nonlinear optical device. It should be noted that the nonlinear effect of the present application arises from the electronic properties in the periodic structure. While the nonlinear optical device of the above-mentioned article is based on the dispersion properties of the optical phonons in a multi-layer dielectric medium, it should be appreciated that the layers of the device of this article have thicknesses on the order of $10^5$A as compared with an average thickness of 100A in the superlattice of the present application.

SUMMARY OF THE INVENTION

The present invention relates generally to mixers and harmonic generator arrangements which incorporate a superlattice structure. In its broadest aspect, apparatus for generating electromagnetic waves having wavelengths different from an input wavelength comprises a superlattice structure having a given longitudinal axis. Also included is means for applying at least an electromagnetic wave having at least a single wavelength to the superlattice at least a component of the electric field of the applied electromagnetic wave being parallel to said given longitudinal axis.

In accordance with a more specific aspect of the present invention, means are also included for applying a pulsed electric field to the superlattice structure; the field having a component in a direction parallel to the longitudinal axis of the superlattice.

In accordance with still more specific aspects of the present invention, the means for applying at least an electromagnetic wave to the superlattice structure includes input and output optical gratings disposed on the surface of the superlattice in such a way that the input electromagnetic wae is guided into the superlattice structure so that the electric field of the electromagnetic wave is parallel to the longitudinal axis of the superlattice structure. The output optical grating removes all the wavelengths generated and the desired wavelength is selected depending on the chosen angle or by well-known filtering means. The output wavelengths are, of course, a function of whether or not an electric field is applied and, odd harmonics of the input wave in the absence of an electric field and both odd and even harmonics in the presence of an electric field are produced. Simultaneously with these harmonics, mixed outputs which are the sum and difference of input wavelengths are also obtainable at the output and, in a manner similar to the selection of a desired harmonic, the desired mixed output is selected by providing an appropriate filter.

In accordance with still more specific aspects of the present invention, the electric field applied may be varied to provide for modulation of the second harmonic since the intensity of the second harmonic is proportional to the electric field and hence to the applied voltage. Also, an electric field bias can be applied to the superlattice to bias the E vs. k characteristics of the superlattice so that the device may be operated at lower light intensity.

The above-mentioned apparatus permits the generation of harmonics of much greater strength than obtainable using naturally occurring materials which exhibit nonparabolicity. This results from the large deviation from parabolicity in the direction of the superlattice which also permits one to obtain outputs which result from nonlinear optical mixing. As a result of the foregoing, when a number of wavelengths which are relatively far apart are applied to the superlattice, it is possible in conjunction with multiple photon processes to obtain relatively long wavelength outputs which were heretofore not easily obtained using naturally occurring semiconductors which exhibit nonparabolicity. The relatively high efficiency of the arrangements of the present invention and the ease of fabrication using relatively well-known fabrication techniques make these arrangements high attractive from both a functional and manufacturing point of view.

It is, therefore, an object of the present invention to provide apparatus which is capable of providing harmonics of an input electromagnetic wave and mixed outputs of a plurality of input electromagnetic waves.

Another object is to provide apparatus in which the nonlinear element exhibits nonparabolicity which is more pronounced than in naturally occurring narrow-gap semiconductors.

Still another object is to provide harmonic generator and mixing apparatus which is more efficient than prior art arrangements and is relatively simple to fabricate.

The foregoing and other objects, features and advantages of the present invention will be apparent from the following more particular description of preferred embodiments as illustrated in the accompanying drawings.

DESCRIPTION OF PREFERRED EMBODIMENT

Figure 1:
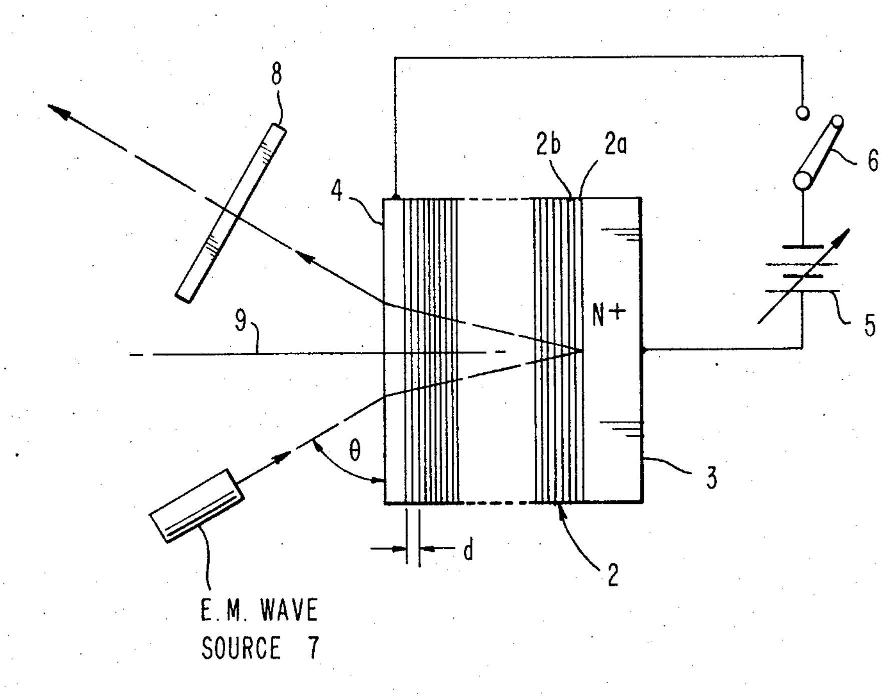
FIG. 1 is a partial schematic, partial cross-sectional drawing of apparatus in accordance with the teaching of the present invention which, in the presence and absence of an electric field, provides both odd and even harmonics and odd harmonics, respectively, of an input electromagnetic wave which impinges on a superlattice structure which exhibits substantial nonparabolicity.

Referring now to FIG. 1, there is shown therein a partial schematic, partial cross-sectional view of electromagnetic wave transformation apparatus 1 consisting of a superlattice structure 2, disposed on an N+ conductivity type semiconductor substrate 3; a transparent electrode 4; a source of voltage 5; one terminal of which is connected to substrate 3, a switch 6 which connects the other terminal of battery 5 to transparent electrode 4; a source of electromagnetic wave radiation 7 and a filter 8 adapted to select a desired harmonic of an input wavelength from source 7.

The structure and method of fabrication for superlattice 2 of FIG. 1 is described in detail in U.S. Pat. No. 3,626,257 in the names of Esaki et al., issued on Dec. 7, 1971 and assigned to the same assignee as the assignee of the present application. The structure and method of fabrication of superlattice 2 is briefly discussed hereinbelow, but, for specific details and the theoretical considerations involved, U.S. Pat. No. 3,626,257 should be considered and is herewith incorporated by reference.

Referring to FIG. 1, superlattice 2 differs from conventional semiconductors in that there is a one dimensional spatial variation in the band-edge energy. More specifically this variation is in a direction along the length of superlattice 2 or parallel to the longitudinal axis 9 of superlattice 2. The band-edge energy in superlattice 2 does not vary in the other two directions.

Superlattice 2 of device 1 is made up of a number of successive regions or layers. A first and alternate ones of these layers are designated 2*a* and the second and alternate layers, 2*b*. The layers 2*a* and 2*b* are not discrete, separate parts of the body but, together with end portion 3, are part of a single crystalline body. However, there are differences in the band-edge energy characteristics of successive layers 2*a*, 2*b* and superlattice 2 is formed by laying down successive layers in an epitaxial deposition process.

Layered superlattice structure 2 of FIG. 1 is formed either by doping or by alloying techniques. When doping is employed, and considering germanium as a typical example of a material to be used, the rightmost portion of device 1 is N+ region 3 which may be a part of the original substrate of germanium on which the superlattice is ultimately grown. N+ portion 3 is doped with an impurity such as phosphorus, antimony or arsenic; all of which are N-type impurities in germanium. Each of the layers 2*a* is epitaxially grown to be N-type ($10^{14}$ - $10^{17}$ atoms/$cm^3$), and each of the layers 2*b* is grown to be intrinsic in nature. In such a case, superlattice 2 is formed of a number of regions or layers alternating between N-type germanium and intrinsic germanium. Each of the layers 2*a*, 2*b* in the particular embodiment shown has the same width and each pair of layers forms one complete spatial period of the alternating layered structure. This spatial period is designated *d* in FIG. 1. The value of the spatial period, hereinafter given in angstrom units, has an important bearing on the characteristics of the superlattice as discussed in detail in the above-mentioned patent. Let it suffice for purposes of the present application to point out that the spatial period is preferably between 50 and 500A; and, therefore, the thickness of the layers 2*a*, 2*b* is between 25 and 250A.

The layers 2*a*, 2*b*, when formed by doping, need not alternate between N and intrinsic, but may be alternately N+ and N. The alternate layers may also be formed using N and P type impurities. The important consideration is the periodic energy band structure which such layered structure provides. The resulting band-edge energy variation for the conduction band varies periodically with distance through the superlattice 2. The periodic variation is one-dimensional along the length of superlattice 2 since there is no variation along the other directions within the layers. Further, it should be noted that the energy gap is essentially the same throughout superlattice 2 and the periodic variation is in the electron potential.

As has been indicated hereinabove, superlattice structure 2 formed by the alternating layers 2*a* and 2*b* may also be formed by alloying. If, as before, germanium is used as substrate 3 and is heavily doped, then alternating regions 2*a* and 2*b* are typically germanium and an alloy of germanium and silicon. Specifically, the first and alternating layers 2*a* are formed of N-type germanium and the second and alternating layers 2*b* are formed by an alloy of germanium and silicon which can be represented as $Ge_{1-x}Si_x$. The gemanium-silicon alloy has a larger energy gap than the germanium itself, and the desired periodicity in the energy band structure is obtained.

Where germanium and germanium-silicon alloy layers are used, a typical value for *x* in the alloy is between 0.1 and 0.2. Other examples of alloys that may be used are alloys of III-V and II-VI compounds. For example, superlattice 2 may be primarily formed from GaAs with N+ region 3 highly doped to be N+ GaAs, the layer 2*a* N-type GaAs which is not as heavily doped as N-type, and layer 2*b* the alloy $Ga_{1-x}Al_xAs$ where *x* would typically be between 0.1 and 0.4. The gallium-aluminum-arsenide alloy has a higher band gap than GaAs and thus, the desired periodic structure is achieved. The greater the value of *x* in such a structure, the greater is the fluctuation in the energy band-edge. Another typical system InAs and $In_{1-x}Ga_xAs$ in which *x* may vary over very large values up to the point where the intermediate layer is completely GaAs and $x = 1.0$.

Device 1 of FIG. 1 includes an N+ substrate 3. Substrate 3 is not necessary to the operation of device 1, but depending on the application is utilized to facilitate the formation of ohmic contacts. Actually, substrate 3 may be considered to be merely an extension of an ohmic contact into superlattice 2. In microwave and other high frequency applications, it is preferable to make direct electrode contact to the superlattice structure. This electrode, similar to electrode 4 in FIG. 1, is chosen to be transparent to the particular electromagnetic wave so that energy can be transmitted through it to and from the superlattice. Thus, the entire structure 1 may be formed of superlattice 2 along with contacts made to the structure or, other regions may be added according to the particular applications in which the device is to be used.

The discussion to this point has been directed primarily to the spatial structure of superlattice 2. Further, though an unspecified number of layers is shown in 1, no more than this is required since the layered structure is repetitive along its length. Each pair of layers added to superlattice 1 produces one more spatial period *d*. However, the number of layers, and therefore, the number of spatial periods is an important consideration in the design of actual devices. Generally speaking, there should be a minimum of 20 and preferably at least 50 such layers. Fifty layers, which is 25 spatial periods, provides sufficient interaction between the photons and the superlattice structure to achieve the desired nonlinear characteristics for the devices shown herein which embody the invention. It should be pointed out here that though it has been broadly stated that the device shown in FIG. 1 is prepared by epitaxial methods, great care must be exercised in the preparation of layers 2*a*, 2*b* and this presents some difficulty where the individual layers are as thin as 25A. Thus, though the normal paths of epitaxial growth from a vapor or solid solution may be applicable, it is preferable to form these epitaxial layers in a high vacuum system. In such a case, the various constituents needed to form the layers are placed in separate crucibles and a shuttering system is employed to epitaxially grow the layers with the desired characteristics on the substrate. One specific technique for the deposition of germanium and doped germanium is embodied in U. S. Pat. No. 3,361,600 in the name of Reisman et al. and entitled "Method of Doping Epitaxially Grown Semiconductor Materials," issued Jan. 2, 1968. The patent covers a method which permits the epitaxial deposition of germanium layers at relatively low temperatures. The patent utilizes a low temperature disproportionation reaction in which doped germanium is deposited at temperatures as low as 350°C. The apparatus utilized in the method of the above-mentioned patent is readily adaptable to the fabrication of superlattice 2, permitting epitaxial growth of layers of different conductivity type as well as different values of resistivity in a given conductivity-type material. Variations in conductivity type are obtained by utilizing pre-mixed tanks of a hydrogen-helium mixture or hydrogen alone, having different conductivity type determining impurities disposed therein. Also, variations in resistivity of a given conductivity type are obtained by simply varying the flow rate of a diluent gas relative to the flow rates of the impurity containing gas. Since the deposition rates can be controlled and ascertained, deposition of doped and undoped layers in order can be simply carried out by controlling the time of deposition and the turn-on and turn-off of the dopant utilized at the end of alternate deposition periods. The technique of the patent has the advantage that deposition is carried out at relatively low temperatures and, as such, the inter-diffusion of the doped and undoped regions is minimized.

Another technique which may be utilized in the fabrication of superlattice structure 2 is shown in a copending application entitled "Vapor Phase Epitaxial Deposition Process for Performing Superlattice Structures and Apparatus Useful Therein," in the name of A. E. Blakeslee, Ser. No. 96,206, filed Dec. 8, 1970 and assigned to the same assignee as the assignee of the present application. As suggested hereinabove, in the superlattice, the proportion of one component is caused to periodically vary from a desired maximum to a desired minimum over an extremely small period. For an n-component system, this is accomplished by forming a stream comprising $n$-1 components and injecting pulses of the nth component in a carrier gas separated by pulses of carrier gas into the $n$-1 component stream, to thereby provide at the substrate alternate, discrete bursts of gas comprising n-components and $n$-1 components, respectively. By controlling diffusion of adjacent pulses and bursts, the proportion of the nth component in the superlattice structure can be varied from a maximum to a minimum within an extremely small period.

In connection with superlattice 2, as a broad generality, it should not be absorbing at the wavelengths being utilized. Also, as an upper limit, the frequency being utilized should be below the fundamental absorption gap of the material of the superlattice. Thus, for GaAlAs the maximum frequency should be below 1.5ev which is 8300A in wavelength. While strictly speaking, there is no lower frequency limit, as a practical matter, when the wavelength being utilized becomes appreciably larger than the thickness of superlattice structure 2, the efficiency of the arrangement drops off rather sharply.

Returning now to FIG. 1, in the usual mode of operation, electromagnetic wave source 7 may be any well known source of electromagnetic waves which is capable of generating wavelengths having a range subject only to the limitations discussed hereinabove. Thus, source 7 may be one which provides outputs in the optical range, the microwave range or the ultra-violet range, for example. Thus, lasers, microwave generators such as klystrons, magnetrons and the like may be utilized to provide suitable sources of electromagnetic waves for the practice of the present invention. If required, a suitable lens system may be utilized to direct the electromagnetic wave energy through transparent electrode 4 and into superlattice 2 where nonlinear mixing and harmonic generation takes place. The theoretical and mathematical considerations which support the nonlinear behavior just mentioned will be pointed out hereinbelow in a separate section.

The only criterion to be adhered to in connection with either harmonic generation or mixing is that the electromagnetic wave directed at superlattice 2 have at least a component of its electric field which is parallel to the longitudinal axis 9 of superlattice 2. This criterion is adhered to in FIG. 1 by introducing an electromagnetic wave from source 7 at an angle $\theta$ relative to the vertical. Under such circumstances, the electric field of the electromagnetic wave has a component parallel to the longitudinal axis 9 of superlattice 2. After entering the superlattice structure 2 via transparent electrode 4, which may be made of a material such as $In_2O_3$ + 5% $SnO_2$, the electromagnetic wave interacts with the superlattice structure; is internally reflected and an output results which, when switch 6 is open, is a plurality of odd harmonics of the input electromagnetic wave. Electrode 4 may be deposited on superlattice 2 in an r.f. reactive sputtering arrangement by sputtering, in an oxygen atmosphere, an indium target containing as a dopant 5 wt.% tin to obtain crack-free films, a 50 volt bias is applied to the anode of the sputtering system. Maximum transparency and optimum resistivity of electrode 4 may be obtained by annealing the deposited electrode in an inert atmosphere at 400°C for approximately 30 minutes. Another suitable electrode formed by reactive sputtering is discussed in an abstract of a paper entitled, "Characteristic of $In_2O_3$:Sn Films Prepared by Reactive R.F. Sputtering" by J.W. Pankratz, Abstract 28, AIME Conference, August 29 - Sept. 1, 1971.

Filter 8 may be a filter well known to those skilled in the art of filtering electromagnetic waves which passes only the desired harmonic as an output electromagnetic wave. The available outputs are the input frequency itself, the third, fifth, seventh – etc., harmonics which have amplitudes of decreasing value in accordance with the well known Fourier series. When switch 6 is closed, however, an electric field is applied across superlattice 2 between substrate 3 and transparent electrode 4 in a direction parallel to the longitudinal axis of superlattice 2. Under such conditions, both odd and even harmonics of the input electromagnetic wave are present at the output. Again, by suitably selecting filter 8 a desired harmonic may be selected as an output. One application of this device is to produce a second harmonic of the input electromagnetic wave by applying an electric field to the superlattice structure and gating the second harmonic on and off by alternately closing and opening switch 6. In another application, the amplitude of the second harmonic may be modulated by maintaining switch 6 in a closed position and varying the output voltage of voltage source 5 in a desired manner. The ability to modulate voltage source 5 is indicated schematically in FIG. 1 by the arrow through voltage source 5. The intensity of the second harmonic is proportional to the voltage applied. So, by varying the electric field applied across superlattice 2, the amplitude of the second harmonic may be modulated. It is, of course, obvious that any suitable modulator which affects the applied field may be utilized to carry out such modulation. The value of electric field required is in the order of a few volts which, because of the relatively small thickness of device 1, provides a relatively high intensity electric field of the order of $10^4$ volts/cm when the total thickness of superlattice structure is about 5000A. While device 1 has been shown connected directly across a voltage source to provide the required electric field, it should be appreciated that such an expedient is not necessary in carrying out the teaching of the present application. Superlattice structure 2 may be suspended in an electric field which is provided by two electrodes which do not touch the extremities of superlattice 2. The only requirements in such a regime are that the electric field be of the required intensity and be disposed in a direction parallel to the longitudinal axis 9 of superlattice 2.

Figure 2:
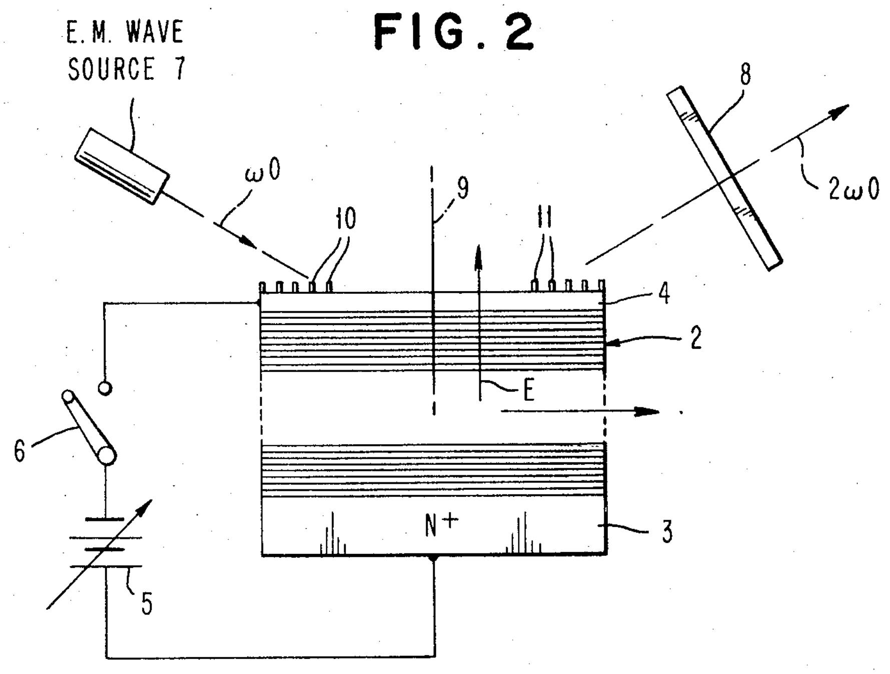
FIG. 2 is a partial schematic, partial cross-sectional view of a superlattice structure employing a waveguide mode wherein an input electromagnetic wave $\omega 0$ is introduced into the superlattice via an optical grating and from which the harmonics of the input wave both odd and even are removed. The desired harmonic is selected by a filter, or by proper selection of the output angle.

Referring now to FIG. 2, there is shown therein another embodiment of the present invention which is capable of providing harmonics of an input electromagnetic wave at its output. Portions of the structure of FIG. 2 which are identical to the same portions in FIG. 1 have been given the same reference characters in FIG. 2. The only difference between the device of FIG. 2 and the device of FIG. 1 is the manner of coupling electromagnetic energy into and out of superlattice 2. In FIG. 2, an input optical grating 10 is utilized to couple an electromagnetic wave from source 7 into superlattice 2 and an output optical grating 11 is utilized to couple the harmonics generated out of superlattice 2. Superlattice 2 is formed on substrate 3 by one of the epitaxial deposition techniques described hereinabove in connection with FIG. 1. Transparent electrode 4 is also formed in the same manner described hereinabove. Optical gratings 10 and 11 are well known to those skilled in the optics art. Instead of using masking in the photo fabrication process, the usual way to make such optical gratings is to utilize two light beams to construct a hologram. The pattern of the hologram gives perfect grating structure without the use of masking. A technique for forming optical gratings is discussed in detail in an article entitled, "Grating Coupler for Efficient Excitation of Optical Guided Waves in Thin Films" by M. C. Dakes et al., Applied Physics Letters, Vol. 16, No. 12, pp. 523–525, June 15, 1970.

In operation, the device of FIG. 2 couples an electromagnetic wave from source 7 into superlattice 2 via input optical grating 10 such that the electric field of the wave is parallel to the longitudinal axis 8 of superlattice 2. The interaction with the superlattice by the input electromagnetic wave is exactly the same as occurs in the device of FIG. 1 and, as a result, the odd harmonics of the input wave are provided in the absence of an electric field and, the odd and even harmonics of the input wave are provided at the output in the presence of an electric field provided by d.c. voltage source 5. As in FIG. 1, an appropriate filter 8 is provided to select the desired harmonic; the second harmonic, for example. Apart from the structural distinction of optical gratings 10 and 11, the device 1 of FIG. 2 functions in exactly the same manner as the device of FIG. 1.

Figure 3:
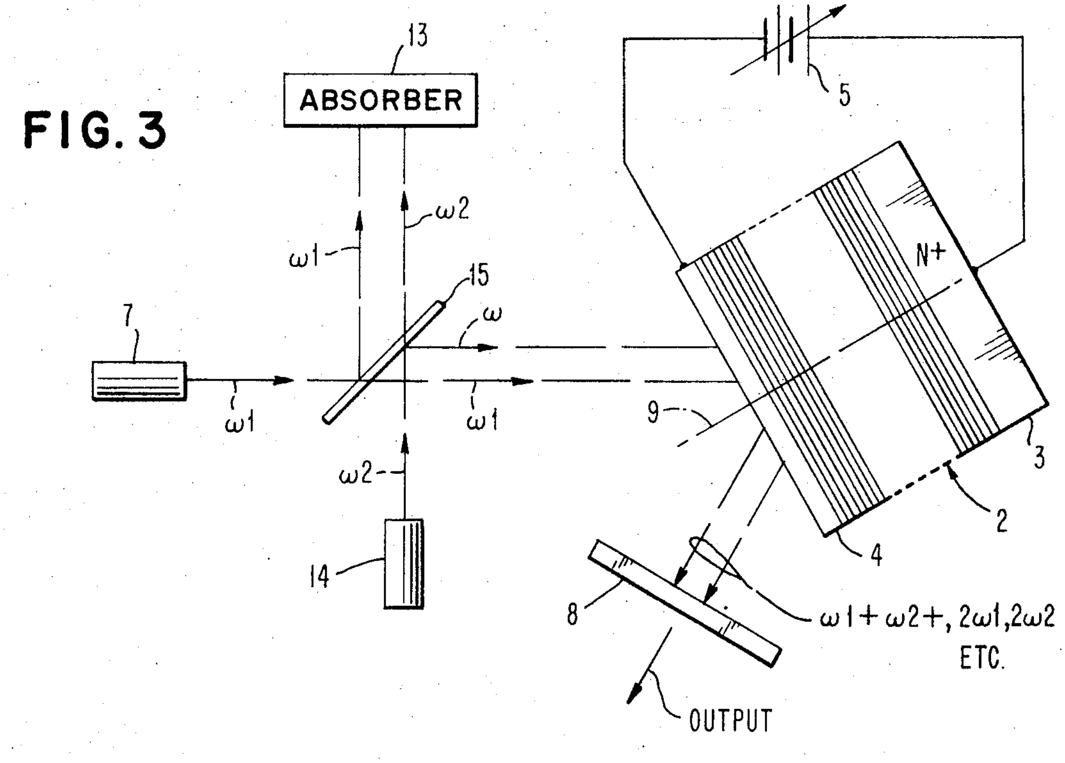
FIG. 3 is a partial schematic, partial cross-sectional view of a superlattice structure which, under conditions of applied electric field and responsive to at least a pair of input electromagnetic waves, provides both harmonics and mixed electromagnetic wave outputs which can be selected by an appropriate filter.

Referring now to FIG. 3, there is shown therein a partial schematic, partial cross-sectional view of a mixing arrangement in accordance with the teachings of the present invention. Portions of FIG. 3 which are identical with FIGS. 1 and 2 have been given the same reference characters in FIG. 3. In FIG. 3, two sources of electromagnetic energy 7, 14 are provided which couple electromagnetic waves of frequencies $\omega 1$, $\omega 2$ respectively, into superlattice 2 via a well known partially reflective, partially transmissive element 15 and transparent electrode 4. The wavelengths represented by $\omega 1$ and $\omega 2$ interact with the superlattice structure 2 and, as a result of its high nonparabolicity, mixed outputs which are the sum and difference of the input electromagnetic waves $\omega 1$ and $\omega 2$ are available as outputs. Also present are all the odd and even harmonics of the input waves since an electrostatic field is provided across superlattice structure 2 by voltage source 5. All possible combinations of the input waves and their harmonics are, of course, present as outputs from superlattice 2. However, it should be appreciated that mixed outputs other than the combination of $\omega 1 \pm \omega 2$ are rather highly attenuated since the probability of the occurence of multiple photon processes other than a two photon process is significantly smaller. It should also be appreciated that the mixing of the input waves $\omega 1$ and $\omega 2$ to provide the sum and difference of these input electromagnetic waves alone is a rather significant accomplishment, particularly with respect to the process $\omega 1 - \omega 2$. Assume for illustrative purposes that $\omega 0 = 10^{15}$ Hertz and $\omega 1 = \omega 0$. Also assume that $\omega 2 = 1.01\ \omega 0$. The sum of the frequencies $\omega 1 + \omega 2 = 2.01\ \omega 0$. The difference $\omega 1 - \omega 2$ provides the output $0.01\ \omega 0$ which is an output in the far infrared region of the electromagnetic spectrum. In FIG. 3, filter 8 is, of course, a filter which passes only the desired wavelength. From the foregoing, it should be clear that the superlattice arrangement of FIG. 3 is capable of producing relatively long wavelength outputs from input wavelengths which are significantly higher in frequency and shorter in wavelength. It is, of course, obvious that electromagnetic wave sources 7 and 14 can be variable sources of electromagnetic waves which are capable of providing relatively broadband outputs; discrete wavelengths of which can be obtained by either tuning or filtering of the outputs. In connection with FIG. 3, it should be clear that d.c. voltage source 5 can be switched in the same manner as the voltage source of FIGS. 1 and 2 to provide only odd harmonics and mixtures of the input waves involving three photons as outputs from superlattice 2. As indicated hereinabove, however, these odd harmonics and three photon mixtures are much less intense than the second harmonic and two photon mixtures.

Figure 4:
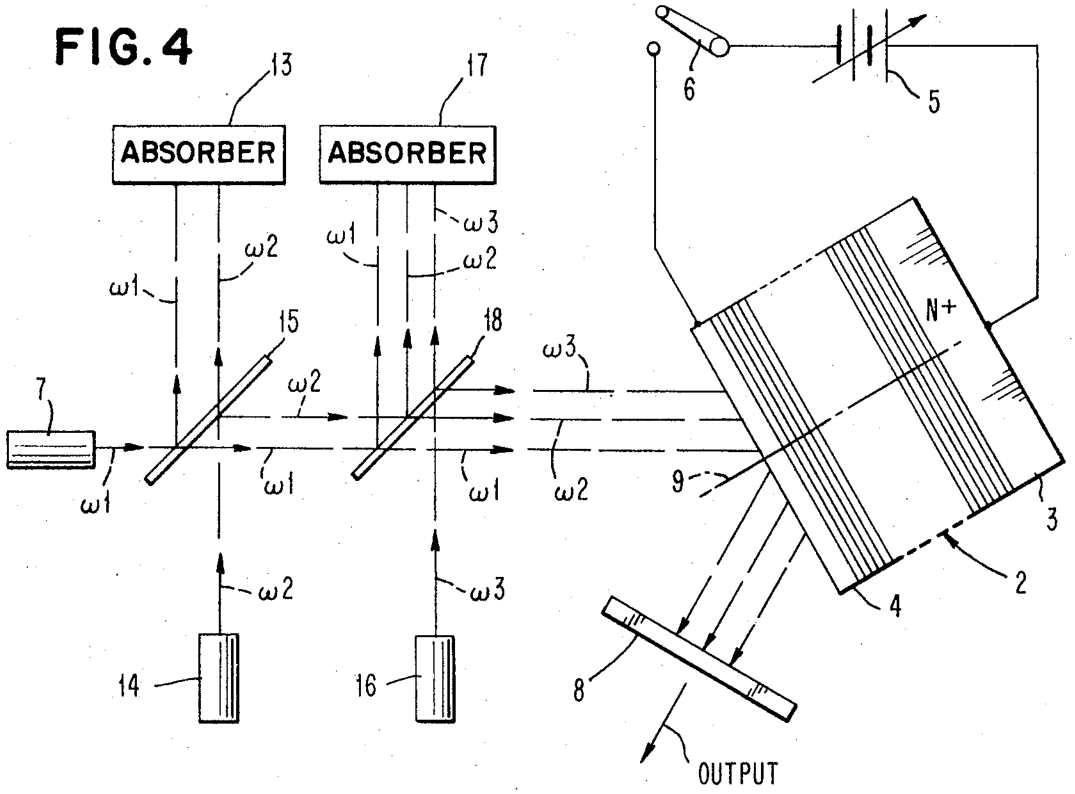
FIG. 4 is a partial schematic, partial cross-sectional view of an arrangement for generating harmonics of input electromagnetic waves as well as mixtures thereof utilizing a superlattice as a nonlinear element which exhibits substantial nonparabolicity both when a field is applied and when a field is not applied. The input electromagnetic waves are applied to the superlattice structure utilizing conventional optical techniques and the output is selected by choosing an appropriate filter.

FIG. 4 is a partial schematic, partial cross-sectional view of an arrangement which is identical to FIG. 3 except for the presence of an additional source of electromagnetic waves 16, an absorber 17 and a partially reflective, partially transmissive element 18. Elements of FIG. 4 which are identical with those shown in FIG. 3 have the same reference characters. In FIG. 4, electromagnetic wave source 16 provides an output $\omega 3$ which, along with electromagnetic waves $\omega 1$ and $\omega 2$ from sources 7, 14, respectively, is ultimately directed via element 18 and transparent electrode 4 into superlattice 2. In the absence of an applied electrostatic field across superlattice 2, outputs which involve three photon processes are available. Thus, in the absence of an applied electric field, outputs of $\omega 1 \pm \omega 2 \pm \omega 3$ as well as odd harmonics of each of the inputs are available. In the presence of an electrostatic field, two photon process outputs are available such as $\omega 1 \pm \omega 2$, $\omega 2 \pm \omega 3$, $\omega 3 \pm \omega 1$ as well as the even harmonics of each of the input waves. In addition, all the outputs described in connection with an absence of electrostatic field are available as outputs. The desired output is, of course, selected by using an appropriate filter 8.

In connection with the three photon processes mentioned hereinabove, it should be appreciated that three input electromagnetic waves are not necessary to achieve such a process. Thus, in FIG. 3 an arrangement having only two electromagnetic wave inputs can provide a mixed output when the input frequencies are relatively far apart by undergoing a three photon process. Under such circumstances where two electromagnetic waves $\omega 1$ and $\omega 2$ interact with superlattice structure 2, two photons at frequency $\omega 2$ and one photon at frequency $\omega 1$ can interact to provide an output equal to $\omega 2 \pm \omega 2 \pm \omega 1$ which provide outputs $\omega 1$ and $2\omega 2 \pm \omega 1$. Another possible interaction occurs when a single photon at frequency $\omega 2$ interacts with two photons at frequency $\omega 1$ providing the mixed output $\omega 2 \pm \omega 1 \pm \omega 1$ resulting in the outputs $\omega 2$ and $2\omega 1 \pm \omega 2$. The former interaction is the most interesting because it permits the generation of relatively long wave outputs from relatively short wave inputs where, for example, one input is twice the frequency of the other. For example, where $\omega 1 = 5 \times 10^{15}$ hertz and $\omega 2 = 2.51 \times 10^{15}$ Hertz, the relationship $2\omega 2 \pm \omega 1$ provides outputs of $10.02 \times 10^{15}$ Hertz and $0.02 \times 10^{15}$ Hertz, respectively. The latter frequency is in the far infrared range and because it involves both the input wavelength and a second harmonic of the other input wavelength, a relatively high intensity electromagnetic wave in the infrared region is obtainable.

THEORETICAL AND MATHEMATICAL CONSIDERATIONS INVOLVED IN HARMONIC GENERATION AND MIXING

Electrons may reach a significant portion of the zone boundary if the Brillouin zone is considerably reduced. The results of the reduction were discussed and applied in U. S. Pat. No. 3,326,257 mentioned hereinabove. The most important result is the introduction of a large deviation from parabolic energy-momentum relationship, which leads to a nonlinear velocity-momentum relationship. In the presence of electromagnetic waves, the crystal momentum of the carriers oscillates at the applied frequencies, and due to nonlinear velocity-momentum, the induced currents will mix. Furthermore, the applied electric field removes the reflection symmetry of E-k relationships, allowing inter-actions involving even numbers of photons.

For a more detailed exposition of the theory involved and of the mathematical considerations involved in the practice of the present application, reference should be made to an article entitled, "Nonlinear Optical Response of Conduction Electrons in a Superlattice," Applied Physics Letters, Vol. 10, Number 7, Oct. 1, 1971, pp. 246–248.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for generating electromagnetic waves having wavelengths different from at least an input wavelength comprising:

an artificial semiconductor superlattice structure having a given longitudinal axis, said superlattice structure comprising a body of semiconductor material at least a portion of which is a superlattice structure having at least 10 layers of semiconductor material, the first and alternate layers thereof having a given band-edge energy, the second and alternate layers thereof having a band-edge energy different from said given band-edge energy and forming with said first and alternate layers at least five spatial periods, the width of each period being less than the mean free path of a carrier along the direction of the said longitudinal axis, and having an upper bound of the order of 500A, and means for applying at least an electromagnetic wave of at least a single wavelength to said structure at least a substantial component of the electric field of said electromagnetic wave being parallel to said axis to produce a plurality of wavelengths different from said at least an input wavelength.

2. A device according to claim 1 further including means for applying an electric field to said structure said field having a component in a direction parallel to said longitudinal axis to produce said plurality of wavelengths and an additional plurality of wavelengths different from said at least an input wavelength.

3. A device according to claim 1 further including means for selecting at least one of said plurality of wavelengths.

4. A device according to claim 1 wherein said plurality of wavelengths are odd harmonics of said at least an input wavelength.

5. A device according to claim 1 wherein the frequency of said at least an electromagnetic wave is below the fundamental absorption gap of said semiconductor.

6. A device according to claim 1 wherein said means for applying at least an electromagnetic wave includes at least a source of electromagnetic waves and means disposed in electromagnetically coupled relationship with said structure for guiding said at least an electromagnetic wave into said superlattice.

7. A device according to claim 1 wherein said means for applying at least an electromagnetic wave includes means for simultaneously applying a plurality of waves to said structure at least a component of the electric field of each of said plurality of waves being parallel to said axis to produce at least mixtures of said plurality of waves and odd harmonics of said plurality of waves.

8. A device according to claim 2 further including means for selecting at least one of said plurality and said additional plurality of wavelengths.

9. A device according to claim 2 wherein said plurality of wavelengths and said additional plurality of wavelengths are odd and even harmonics of said at least an input wavelength.

10. A device according to claim 2 wherein said means for applying an electric field include a source of d.c. voltage, one terminal thereof being electrically connected to said superlattice, and a transparent electrode disposed on said superlattice connected to the other terminal of said source of d.c. voltage.

11. A device according to claim 6 wherein said means for guiding includes an input grating and an output grating disposed in juxtaposition with said structure such that said at least an electromagnetic wave propagates in said superlattice with the electric field thereof parallel to said axis.

12. A device according to claim 7 further including menas for applying an electric field to said structure said field having a component in a direction parallel to said axis to produce mixtures of said plurality of wavelengths and odd and even harmonics of said plurality of wavelengths.

13. A device according to claim 10 wherein said d.c. voltage source is a variable source of voltage.

14. A device according to claim 12 wherein said means for simultaneously applying a plurality of waves includes a plurality of sources of electromagnetic waves and means disposed in electromagnetically coupled relationship with said structure for guiding said plurality of waves into said superlattice.

15. A device according to claim 13 further including means connected to said d.c. voltage source for pulsing said source on and off.

16. A device according to claim 14 wherein said means for guiding includes a plurality of partially transmitting, partially reflecting elements disposed between said at least a source and said superlattice.

17. A device according to claim 14 wherein said means for guiding includes an input grating and an output grating disposed in juxtaposition with said structure such that said plurality of waves propagates in said superlattice with the electric fields thereof parallel to said axis.

18. A device for generating electromagnetic waves having output wavelengths different from an input wavelength comprising:

an artificial semiconductor superlattice structure having a given longitudinal axis, said superlattice structure comprising a body of semiconductor material at least a portion of which is a superlattice structure having at least 10 layers of semiconductor material, the first and alternate layers thereof having a given band-edge energy, the second and alternate layers thereof having a band-edge energy different from said given band-edge energy and forming with said first and alternate layers at least five spatial periods, the width of each period being less than the mean free path of a carrier along the direction of said longitudinal axis, and having an upper bound of the order of 500A, means for applying a plurality of electromagnetic waves to said structure at least a substantial component of the electric field of each of said plurality of waves being parallel to said given axis, means for applying a pulsed electric field to said structure said field being parallel to said given axis, and, means electromagnetically coupled to said superlattice for selecting one of a plurality of odd harmonics of said input waves and mixtures of said input waves, when said electric field is off and a plurality of odd and even harmonics of said input wave and mixtures of said input waves when said electric field is on.

* * * * *